United States Patent
Voto et al.

(10) Patent No.: US 9,645,962 B2
(45) Date of Patent: *May 9, 2017

(54) FLEXIBLE MOBILE DEVICE CONNECTIVITY TO AUTOMOTIVE SYSTEMS WITH USB HUBS

(71) Applicant: DELPHI TECHNOLOGIES, INC., Troy, MI (US)

(72) Inventors: Robert M. Voto, Clarkston, MI (US); Shyambabu Yeda, Rochester Hills, MI (US); Craig Allan Petku, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,096

(22) Filed: Sep. 6, 2016

(65) Prior Publication Data

US 2016/0371213 A1 Dec. 22, 2016

Related U.S. Application Data

(63) Continuation-in-part of application No. 14/487,947, filed on Sep. 16, 2014, now Pat. No. 9,460,037.

(Continued)

(51) Int. Cl.
*G06F 13/36* (2006.01)
*G06F 13/40* (2006.01)
(Continued)

(52) U.S. Cl.
CPC ........ *G06F 13/4022* (2013.01); *G06F 13/385* (2013.01); *G06F 13/4045* (2013.01);
(Continued)

(58) Field of Classification Search
CPC ............. G06F 13/4022; G06F 13/4045; G06F 13/385; G06F 13/387; G06F 13/366; G06F 13/4068; G06F 13/4282; G06F 13/4027

See application file for complete search history.

(56) References Cited

U.S. PATENT DOCUMENTS 6,073,188 A    6/2000   Fleming
6,732,219 B1   5/2004   Broyles
(Continued)

FOREIGN PATENT DOCUMENTS

JP     2003256351 A    9/2003
TW     470887 B         1/2002

OTHER PUBLICATIONS

"FFI Rapport—A Study of Computer Interfaces for Soldier Systems", Lars Erik Olsen & Joakin Flathagen, Norwegian Defence Research Establishment, Oct. 10, 2005.

(Continued)

*Primary Examiner* — Ernest Unelus
(74) *Attorney, Agent, or Firm* — Robert J. Myers

(57) ABSTRACT

A USB hub module which is configured to enable a vehicle's embedded USB host to connect to multiple mobile devices through a USB hub, regardless of whether the mobile devices are configured to act as USB hosts or USB devices, without providing USB OTG controllers or additional vehicle wiring or inhibiting functionality of consumer devices connected the module while one consumer device connected to the module operates in USB host mode. Preferably, the module is configured so that no additional cabling or hardware changes are required to the head unit. The module can be employed between the embedded USB host, USB hub and at least one consumer accessible USB port. When the consumer device is acting as a USB host, signals between the consumer device and the vehicle's (Continued)

embedded USB host are processed through a bridge, thereby rendering the consumer device compatible with the embedded USB host.

19 Claims, 10 Drawing Sheets

Related U.S. Application Data

(60) Provisional application No. 61/882,915, filed on Sep. 26, 2013.

(51) Int. Cl.
*G06F 13/42* (2006.01)
*G06F 13/38* (2006.01)

(52) U.S. Cl.
CPC .. *G06F 13/4282* (2013.01); *G06F 2213/0042* (2013.01); *G06F 2213/4004* (2013.01)

(56) References Cited

U.S. PATENT DOCUMENTS

| | | | |
|---|---|---|---|
| 6,934,793 B2 | 8/2005 | Ying et al. |
| 6,957,287 B2 | 10/2005 | Lou et al. |
| 7,130,656 B2 | 10/2006 | Okagaki et al. |
| 7,280,802 B2 | 10/2007 | Grady |
| 7,478,191 B2 | 1/2009 | Wurzburg et al. |
| 7,523,243 B2 | 4/2009 | Bohm et al. |
| 7,627,708 B2 | 12/2009 | Bohm et al. |
| 8,447,598 B2 | 5/2013 | Chutorash et al. |
| 8,447,890 B1 | 5/2013 | LeTourneur et al. |
| 2003/0167345 A1 | 9/2003 | Knight et al. |
| 2006/0056401 A1 | 3/2006 | Bohm et al. |
| 2007/0067553 A1 | 3/2007 | Chang |
| 2007/0086724 A1 | 4/2007 | Grady et al. |
| 2007/0156293 A1 | 7/2007 | Kellzi et al. |
| 2008/0005262 A1 | 1/2008 | Wurzburg et al. |
| 2009/0117890 A1 | 5/2009 | Jacobsen et al. |
| 2011/0054721 A1 | 3/2011 | Goodrich et al. |
| 2011/0124300 A1 | 5/2011 | Sinai |
| 2011/0208891 A1* | 8/2011 | Meyers .............. G06F 13/385 710/313 |
| 2011/0208892 A1* | 8/2011 | Meyers .............. G06F 13/4226 710/313 |
| 2012/0134506 A1 | 5/2012 | DeBiasio et al. |
| 2012/0191811 A1 | 7/2012 | Ng et al. |
| 2012/0290859 A1 | 11/2012 | Saladin et al. |
| 2013/0053003 A1 | 2/2013 | King, II |
| 2013/0106750 A1 | 5/2013 | Kurosawa |
| 2016/0132448 A1* | 5/2016 | Maung .............. G06F 13/366 710/104 |

OTHER PUBLICATIONS

"USB 2.0 Autoswitch User's Manual", Lindy Electronics Limited & Lindy-Elektronic GMBH, Sep. 2002.

"APC USB 2.0 Host Controller—Device Driver Download", http://www.liutilities.com/devicedriver/apcusb20hostcontroller/, Jul. 2002.

"Peripheral-Sharing Hardware Suits Education's Needs to a 'T'", Terian Tyre, T H E Journal (Technological Horizons In Education), Oct. 1988.

* cited by examiner

FLEXIBLE MOBILE DEVICE CONNECTIVITY TO AUTOMOTIVE SYSTEMS WITH USB HUBS

CROSS-REFERENCE TO RELATED APPLICATION

This application is a continuation-in-part application and claims benefit under 35 U.S.C. §120 of U.S. patent application Ser. No. 14/487,947, filed Sep. 16, 2014, which claimed priority under 35 U.S.C. §119(e) of U.S. Provisional Patent Application No. 61/882,915, filed on Sep. 26, 2013, the entire disclosure of each of which are hereby incorporated herein by reference.

TECHNICAL FIELD OF THE INVENTION

The present invention generally relates to Universal Serial Bus (USB) connectivity between, for example, mobile consumer devices and vehicle electronic systems. More specifically, the present invention relates to a system which is configured to provide that consumer devices that act as either USB host or USB device can connect to a vehicle's embedded USB host that does not have USB On the Go (OTG) capability through an embedded USB hub in the vehicle.

BACKGROUND OF THE INVENTION

Historically, mobile consumer devices such as media players, smart phones, tablets and the like have relied on connections to other devices, such as laptop or desktop personal computers (PCs) to acquire content, exchange data, and charge the device's internal battery. For many years now, that has been accomplished through USB ports on each device. The use of USB technology is suitable for such needs since it is commonly available, familiar to the end user, cost effective and ubiquitous. USB protocols require a point-to-point connection in which one end is the USB host or master, and the other end is a USB device or slave. In this way, the flow of messages between the two devices is managed and controlled, whereby the USB device responds to messages initiated by the USB host. Historically, PCs have provided USB host ports for connection to simpler USB devices such as printers, memory sticks, mobile phones, etc. The USB host has a greater burden of software and hardware requirements than a USB device, so it has made sense to designate the PC as the USB host in such systems.

In vehicle systems that employ USB connections, the same concepts apply. In such systems, the vehicle is typically the USB host. The USB host function is often embedded into a component of the vehicle infotainment system, such as into the radio or other control module. Typically, multiple USB ports are strategically designed into the vehicle in locations convenient for the driver and passengers to connect their consumer devices. Once a consumer device is connected to one of the ports, the device begins charging and the vehicle infotainment system can access content on the consumer device. This is useful to enable features such as streaming music, video and other services the device may provide.

Such a system requires that each of the USB ports be physically connected to the vehicle's USB host in a manner suitable for USB data flow. This is accomplished through electrical cabling which is embedded in the vehicle, and which connects each of the ports to the USB host. Since there can be many USB ports in a vehicle, and each port requires a cable to connect the port to the USB host, it is desirable to share cabling when possible to minimize cost and mass of the vehicle. This is accomplished through the use of USB hubs. USB hubs allow a single USB host to connect to multiple USB devices over a single cable between the USB host and the USB hub. As shown in FIGS. 1 and 2, a single USB hub can connect one USB host to several USB devices. Specifically, FIG. 1 illustrates a system wherein a self-powered USB hub module 110 having a plurality of USB ports 112 connects to a plurality of USB devices via a plurality of consumer-facing USB ports 114, while FIG. 2 illustrates a system wherein a self-powered USB hub module 210 provides not only a plurality of USB ports 212 which are in communication with a plurality of consumer-facing USB ports 214, but also a Secure Digital (SD) card reader 216 which is connected to a consumer-facing SD card connector 218. Other portions of FIGS. 1 and 2, such as Power Management 116, 220, are standard in the industry and self-explanatory upon viewing FIGS. 1 and 2.

Furthermore, as shown in FIG. 3, multiple USB hubs can be tiered, such that USB hubs connect to other USB hubs. Specifically, FIG. 3 illustrates a vehicle system architecture that includes a central vehicle microcontroller 310 (also referred to as the head unit 310). Connected to the head unit 310 are components or systems such as displays 312, the audio or entertainment system 314, and the driver controls 316. The head unit 310 may be architected as a single module encompassing all functions or distributed such that various functions are managed by individual modules. The head unit 310 includes a Root USB hub 318 which is typically connected to one or more downstream USB hubs 320 A-D distributed throughout the vehicle. Each USB hub 320 has a plurality of downstream ports 322 (at least one of which may be an SD reader 324 or USB audio device—not shown), thereby effectively providing that each USB port 320 A-D in the vehicle has a connection to the USB host 318 or head unit 310. In FIG. 3, for example, the Root Hub is embedded in the radio, and is connected to four (4) self-powered USB hubs 320 A-D, wherein one is in the vehicle's center console 320A, one is in the vehicle's center stack 320B, and two are in the vehicle's rear seats 320C, 320D.

Recently, mobile devices such as smart phones have gained in popularity. This is, in part, due to their usefulness as standalone computing devices. With advances in consumer electronic technology and increases in the speed of mobile networks, these devices are no longer reliant on being connected to PCs to access content. These smart mobile devices now have many of the same hardware resources, connectivity and software operating systems that only PCs had in past years. As has been the case with desktop PCs, accessories for these mobile devices have become available to aid in their ease of use. These accessories have included devices such as keyboards, mice, displays, touchscreen, audio systems, and other interface devices. These accessories commonly connect via a USB connection. By way of established convention in the consumer electronics market, these accessories are typically low cost and limited in USB capability to act only as a USB device. To connect them to a smart phone, the smart phone must be the USB host. Therefore, leading mobile device manufacturers and system designers have begun designing their mobile device products (i.e. smart phones, tablets, etc.) to support both USB host and USB device roles. In other words, the phone may configure itself such that it can function as a USB device when it needs to be, or as a USB host when it needs to be. Recently, the system level design thinking has shifted towards viewing smart phones as the USB host, and any device connecting thereto as the USB device. Again, this is not surprising since this is exactly how laptops and PCs work today. Extending this trend into the future, it can be predicted that the smart phone will act primarily as the USB host, and will rarely or never act as a USB device. This presents some problems for automotive systems.

As explained previously, automotive systems have a USB host and require USB devices to connect to it. If a phone acts as a USB host, then the system will not function since by USB convention, two USB hosts cannot directly connect with each other. Automotive manufacturers desire compatibility with smart phones and are therefore motivated to adapt to this changing technology. A redesign of the USB architecture in the vehicle is thus necessary such that the vehicle can act either as the USB host (when necessary to connect to USB devices such as memory sticks, thumb drives, etc.) or USB device (when necessary to connect to USB hosts, such as a smart phone which demands to be USB host rather than USB device.

The USB organization has added a standard that addresses the need for devices to act as either USB host or USB device and as such can be considered a "dual role" USB controller. It is referred to in USB nomenclature as "On The Go" or "OTG" for short. Any device that meets the OTG standard can act as either USB host or USB device and can change roles dynamically. Therefore, one possible approach to modifying the vehicle USB architecture to support all use cases is to upgrade the vehicle's USB host to USB OTG. This solution addresses the issue but has some disadvantages. First, USB hubs do not support OTG and can no longer be used in the system. Each consumer accessible USB port that supports OTG must have a dedicated wire link to a dedicated OTG controller in the head unit thus negating the wiring savings associated with use of USB hubs. As a result several costly cables may need to be added to the vehicle's electrical system. Second, there may not be enough OTG controllers available in the head unit to connect to each of the vehicle's user accessible USB ports. This then forces the vehicle designer to choose a limited number of the many USB ports in the vehicle to support the OTG function and run dedicated USB cables to them. This can lead to user confusion and dissatisfaction since only certain consumer ports support the required functionality. Also, ports that support OTG may be co-located with other physically identical ports that do not. If the user chooses the wrong one, the applications they desire to run from the consumer device that requires USB host mode won't work.

Another possible solution is to implement custom USB hubs wherein the USB hub is able to dynamically swap its upstream port with one it's downstream ports when commanded to do so. System solutions built with this concept still require OTG controllers in the head unit but benefit from the fact that no additional wires need to be installed in the car. The existing USB cable between the USB OTG host and the USB hub can facilitate the necessary USB communications between the USB OTG controller in the head unit and a consumer device in USB host (such as a smart phone). This solution also has some disadvantages however. For example, when the USB hub is commanded to swap it's upstream port with a downstream port, all other downstream ports of the USB hubs lose their data connection with the head unit. While in this mode the head unit access to the other downstream ports of the USB hub cease. This may prevent use of certain vehicle system functions such as navigation or audio playback that may need consistent access to the other downstream ports of the hub to function. Furthermore, it requires the head unit to have an available USB OTG port and a signaling path to control the hub upstream/downstream port configuration.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to an embodiment of this invention, a Universal Serial Bus (USB) hub module is provided. The USB hub module includes an upstream USB port configured to be interconnected to a USB host and a plurality of downstream USB ports configured to be interconnected to a plurality of USB enabled consumer devices. The USB hub module also includes a USB hub that is interconnected to the upstream USB port and the plurality of downstream USB ports. The USB hub is configured to broadcast data from the upstream USB port to each downstream USB port and to transmit data from each downstream USB port to the upstream USB port. The USB hub module further includes a USB bridge interconnected to the USB hub that is configured to connect the upstream USB port to a USB host and a USB routing switch interconnected to the USB bridge, the USB hub, and the plurality of downstream USB ports. The USB routing switch is configured to connect a first downstream USB port of the plurality of downstream USB ports to the upstream USB port through the USB bridge when a consumer device connected to the first downstream USB port is the USB host. The USB routing switch is further configured to initiate bidirectional communication with the upstream USB port. The USB routing switch is configured to connect the first downstream USB port directly to the USB hub when the consumer device connected to the first downstream USB port is configured to only respond to communication from the upstream USB port, thereby rendering the consumer device compatible with a device connected to the upstream USB port.

The USB routing switch may be configured to connect the first downstream USB port to the USB hub through the USB bridge when a first consumer device connected to the first downstream USB port is acting as the USB host. The USB routing switch is configured to simultaneously connect a second downstream USB port of the plurality of downstream USB ports directly to the USB hub when a second consumer device connected to the second downstream USB port is acting as a USB device, thereby rendering the first and second consumer devices compatible to communicate simultaneously with the upstream USB port.

The USB hub module may be configured to recognize whether the consumer device connected to the first downstream USB port is configured to act as the USB host or as a USB device and control the USB routing switch accordingly.

The USB hub module may be configured to dynamically switch operation of the plurality of downstream USB between a USB device mode and a USB host mode.

The USB routing switch may be configured to connect the consumer device to either the USB bridge or the USB hub based on whether the consumer device attached to each downstream USB port in the plurality of downstream USB ports is configured to act as the USB host or a USB device.

The USB routing switch may include a plurality of USB analog multiplexing switches. The USB routing switch may include digital routing logic The USB bridge may be configured to control the USB routing switch and may include a bridge controller as well as endpoint buffers. The endpoint buffers may be configured to support a USB data connection pipe between an infotainment system and the consumer device.

The USB hub module may further include a logic circuit configured to provide data handshaking to negotiate electrical power transfer from the USB hub module to a first consumer device that is connected to the first downstream USB port. The USB hub module may also include a power supply circuit configured to provide electrical power from the USB hub module to the first consumer device. The logic circuit may include a communication control stack. The power supply circuit may include adjustable voltage power supplies.

According to another embodiment of the invention, an integrated circuit (IC) is provided. The integrated circuit includes a USB hub that is configured to be interconnected to an upstream USB port and a plurality of downstream USB ports. The USB hub is configured to broadcast data from the upstream USB port to each downstream USB port and to transmit data from each downstream USB port to the upstream USB port. The IC also includes a USB bridge interconnected to the USB hub and configured to connect the upstream USB port to a USB host and a USB routing switch interconnected to the USB bridge, the USB hub, and the plurality of downstream USB ports. The USB routing switch is configured to connect a first downstream USB port of the plurality of downstream USB ports to the upstream USB port through the USB bridge when a consumer device connected to the first downstream USB port is the USB host. The USB routing switch is further configured to initiate bidirectional communication with the upstream USB port. The USB routing switch is configured to connect the first downstream USB port directly to the USB hub when the consumer device connected to the first downstream USB port is configured to only respond to communication from the upstream USB port, thereby rendering the consumer device compatible with a device connected to the upstream USB port.

The USB routing switch may be configured to connect the first downstream USB port to the USB hub through the USB bridge when a first consumer device connected to the first downstream USB port is acting as the USB host. In this instance, the USB routing switch is configured to simultaneously connect a second downstream USB port of the plurality of downstream USB ports directly to the USB hub when a second consumer device connected to the second downstream USB port is acting as a USB device, thereby rendering the first and second consumer devices compatible to communicate simultaneously with the upstream USB port.

The USB routing switch may be configured to connect the consumer device to either the USB bridge or the USB hub based on whether the consumer device attached to each downstream USB port in the plurality of downstream USB ports is configured to act as the USB host or a USB device. The USB bridge may be configured to control the USB routing switch.

The IC may further include a logic circuit that is configured to provide data handshaking to negotiate electrical power transfer from the USB hub module to a first consumer device connected to the first downstream USB port. The logic circuit may include a communication control stack.

Still other embodiments are entirely possible, some of which are described and illustrated herein. For example, the concept can be extended to include additional embedded USB device functions such as USB HID and USB Audio. Further it is also envisioned that all consumer facing USB ports of the USB hub module can emulate or otherwise support dual role USB capability provided that each downstream port has a Bridge to support USB host mode for the connected device and a direct connection to the USB hub to support USB device mode. In all cases, compliance to USB protocols and architectures is preferably maintained.

BRIEF DESCRIPTION OF THE SEVERAL VIEWS OF THE DRAWING

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE INVENTION

Figure 1:
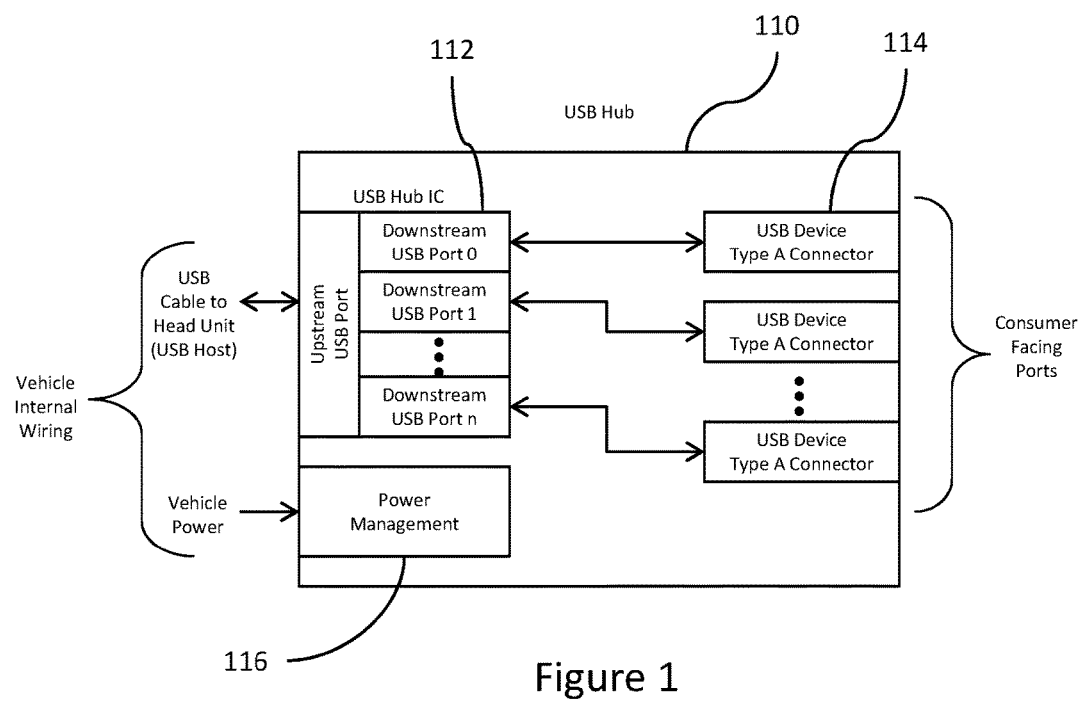
FIG. 1 illustrates a system wherein a multiple port self-powered USB hub functions to connect a single USB host to a plurality of USB ports.
Figure 2:
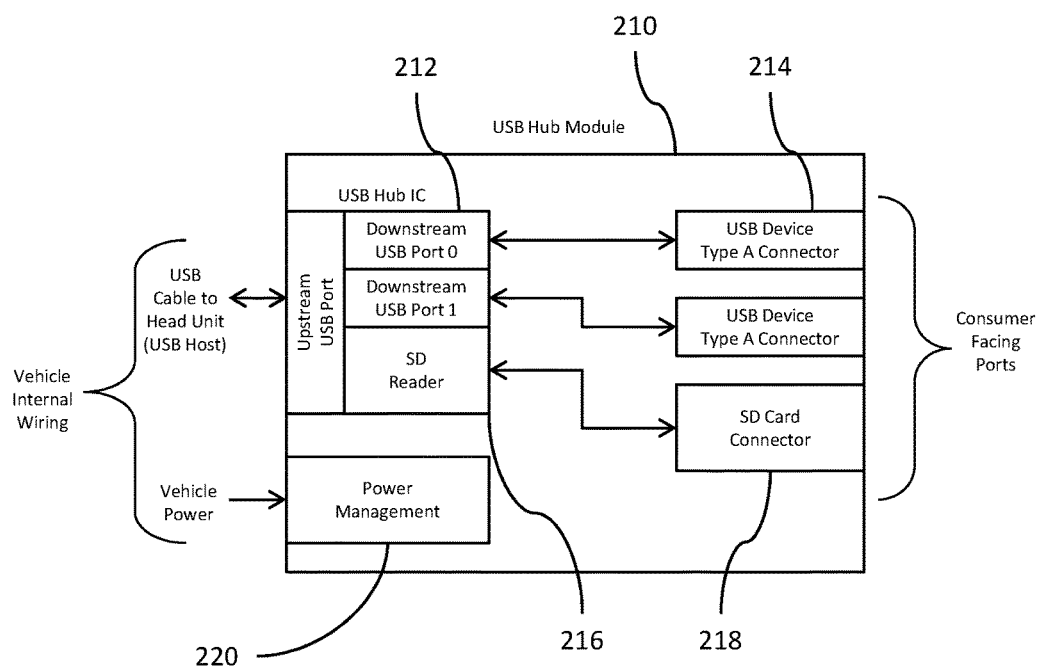
FIG. 2 illustrates a system wherein a self-powered USB hub provides not only a plurality of USB ports, but also a Secure Digital (SD) card reader.
Figure 3:
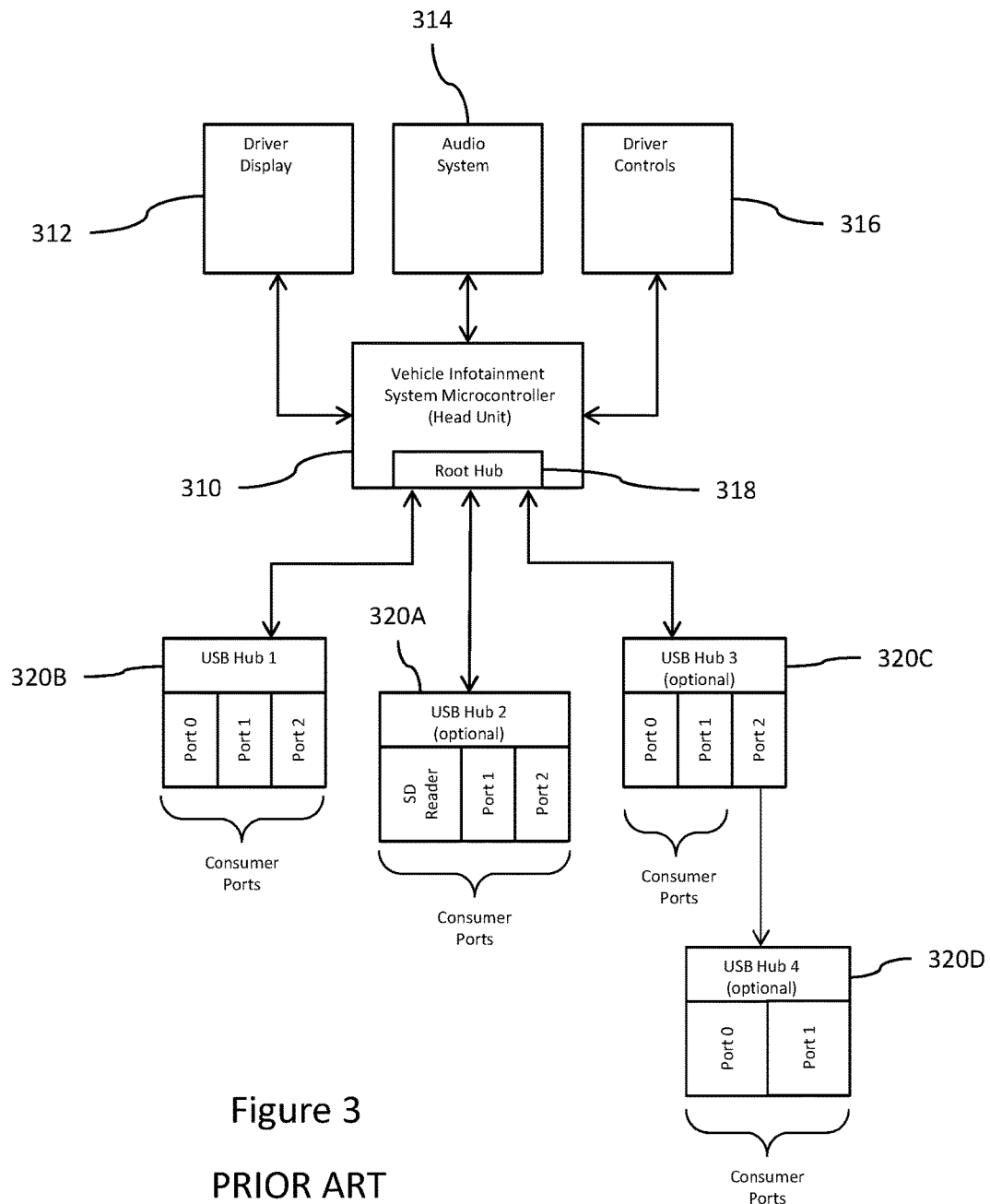
FIG. 3 illustrates a vehicle infotainment system structure wherein multiple USB hubs are connected together or tiered, such that USB hubs feed other USB hubs.

While this invention may be susceptible to embodiment in different forms, there are specific embodiments shown in the drawings and will be described herein in detail, with the understanding that the present disclosure is to be considered an exemplification of the principles of the invention, and is not intended to limit the invention to that as illustrated.

Figure 4:
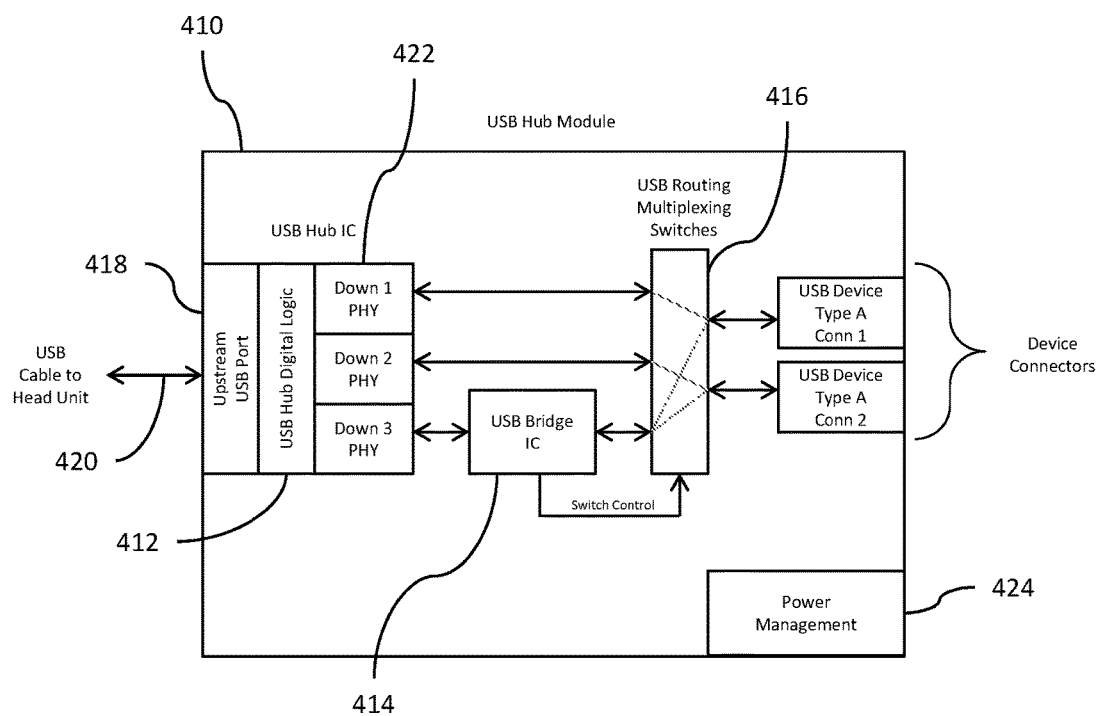
FIG. 4 illustrates a system which is in accordance with an embodiment of the present invention, wherein a USB hub, USB bridge and a switching device are provided as discrete components.

FIG. 4 illustrates a system which is in accordance with an embodiment of the present invention. The system is configured to effectively render a vehicle's embedded USB host compatible with consumer devices which are configured to also act as USB host or USB device. The system is in the form of a self-powered USB hub module 410 having a USB hub 412, a USB bridge 414, and a switching device 416 implemented as discrete devices. The USB hub 412 is preferably provided in the form of an integrated circuit (IC), and is configured (via an upstream USB port 418) connected to a vehicle's embedded USB host (such as a USB host in a head unit—not shown) via vehicle internal wiring, such as, in one embodiment, via a single USB data cable 420 between the head unit and USB hub 412. The USB hub 412 also includes a plurality of downstream USB ports 422, at least one of which is connected to the USB bridge 414 (which also is preferably provided in the form of an integrated circuit (IC)). At least one downstream USB port 422 of the USB hub 412 is connected to the switching device 416 (such as USB analog multiplexing switches, for example). The switching device 416 is configured to be connected to at least one USB port 422 in the vehicle for connection to a consumer device. The USB bridge 414 is configured to effectively control the switching device 416 although other control mechanisms are envisioned. The USB hub module 410 is configured such that signals received from at least one USB port 422 are received by the switching device 416, and the switching device 416 routes the signals to the USB bridge 414 or the USB hub 412. In the case where the consumer device is acting as USB host, the USB bridge 414 processes the USB packets from the downstream USB port 422 and provides them to the USB hub 412, thereby rendering the consumer device compatible with the vehicle's embedded USB host. In the case where the consumer device is acting as USB device, the USB bridge 414 controls the switching device 416 such that the switching device 416 provides the USB signaling directly to the USB hub 412, bypassing the USB bridge 414.

As shown in FIG. 4, the system also includes Power Management structure 424, as well as some other conventional structure not specifically shown in FIG. 4, but which would be readily assumed to be present by one having ordinary skill in the art.

In use, the head unit controls the switching device 416 via the USB bridge hardware or any other convenient means of control. The head unit software application may choose to enable, for example, a phone on any one of the consumer USB ports, by requesting, commanding or otherwise knowing the phone is required to be in USB host mode and commanding the routing of the specific USB port the phone is attached to the USB bridge 414. Once routed to the USB bridge 414, the phone will detect a USB device is connected and the phone will begin the standard USB enumeration sequence. The detection and enumeration processes are defined by USB standards and not explained here in detail. However, for purposes of describing the operation of the invention, a general understanding is provided herein. The enumeration process follows a strict sequence of USB descriptor requests from the USB host and USB descriptor responses from the USB device that allow the Host to determine the capabilities and functions of the USB device and configure the USB device for operation. Once the complete set of device descriptors are known the USB host will then load the appropriate USB driver(s) and applications to support in the functionality that the USB device provides. In the scope of this invention it is envisioned that the responses to the descriptor requests made by the phone (USB host) are either answered locally by the Bridge or preferably, the requests are forwarded through the USB bridge 414 to the head unit where its device drivers process the request and return the response. The descriptor responses from the device driver are conveyed to the USB bridge 414, which then, in turn, passes them to the phone. By passing descriptor request to the head unit drivers and returning the responses from the head unit drivers back to the consumer device, the USB bridge 414 appears as a transparent component in the USB system architecture. The system capabilities are controlled by the head unit and the system remains flexible without need for changes to the USB bridge firmware or hardware when the system designer requires changes to the descriptor responses. Once the consumer device completes the enumeration process, the head unit's USB functional capabilities are known to the consumer device and the consumer device may enable use of those functions over USB communication. At this point, the consumer device or the head unit may begin activating any number of supported services such as data connections, streaming audio and streaming video to and from the vehicle via the USB bridge 414.

Another embodiment of the present invention can be provided, wherein the bridge is configured to act as an OTG port thus negating the need for switches and/or routing logic. In this case there would exist one Bridge functional block for each downstream port. This embodiment would effectively be a more generalized case of the example illustrated in FIG. 4. FIG. 4 shows just one USB bridge 414 that any one of the downstream USB ports 422 can be routed to. With just one USB bridge 414, only one downstream USB port 422 can be connected to a USB host at a time. However, if each downstream port of the USB hub has a dedicated USB bridge, then multiple downstream ports can support connection to USB host devices at the same time. Thus, any consumer port can be in either USB host or USB device mode at any time independently of the others.

Figure 5:
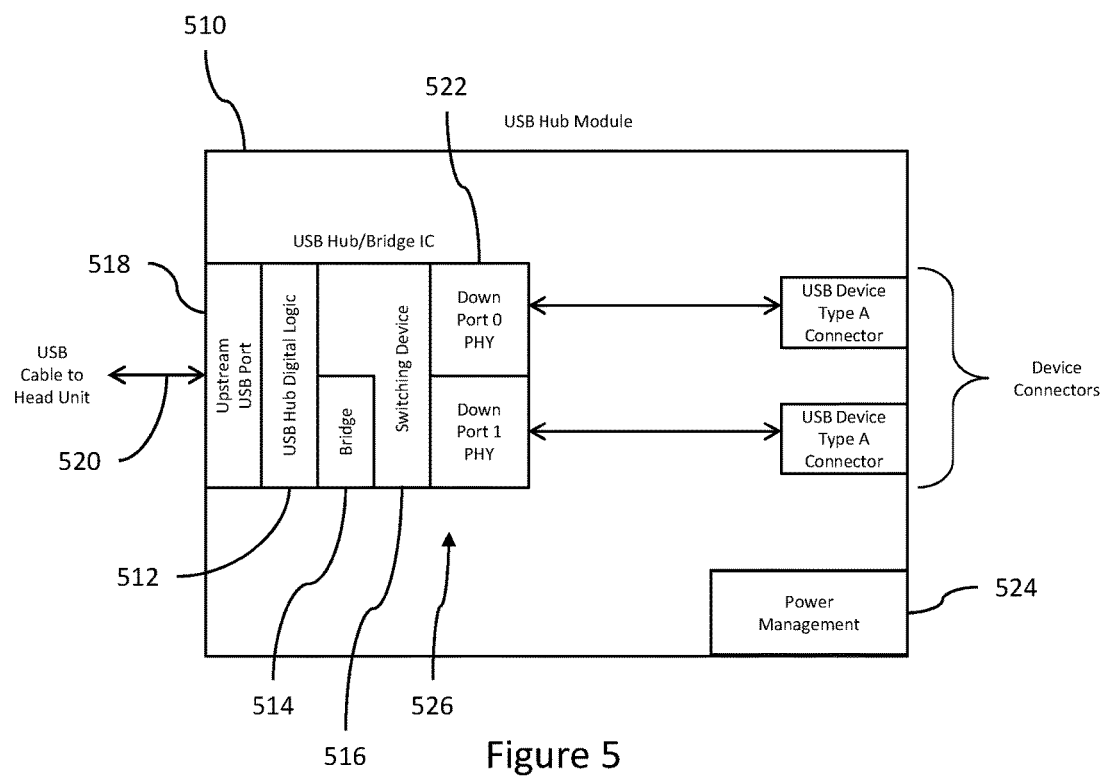
FIG. 5 illustrates a system which is in accordance with an alternative embodiment of the present invention, wherein USB routing/switching logic and a USB bridge are integrated with a USB hub in a combination USB hub/bridge integrated circuit (IC)

FIG. 5 illustrates an alternative embodiment of a USB hub module 510 wherein the switching device 516 comprises USB routing logic, and both the switching device 516 and the USB bridge 514 are integrated with the USB hub 512 in a combination USB hub/bridge integrated circuit (IC) 526. This configuration has cost and size advantages over building it with discrete components connected together on a printed circuit board.

Figure 6:
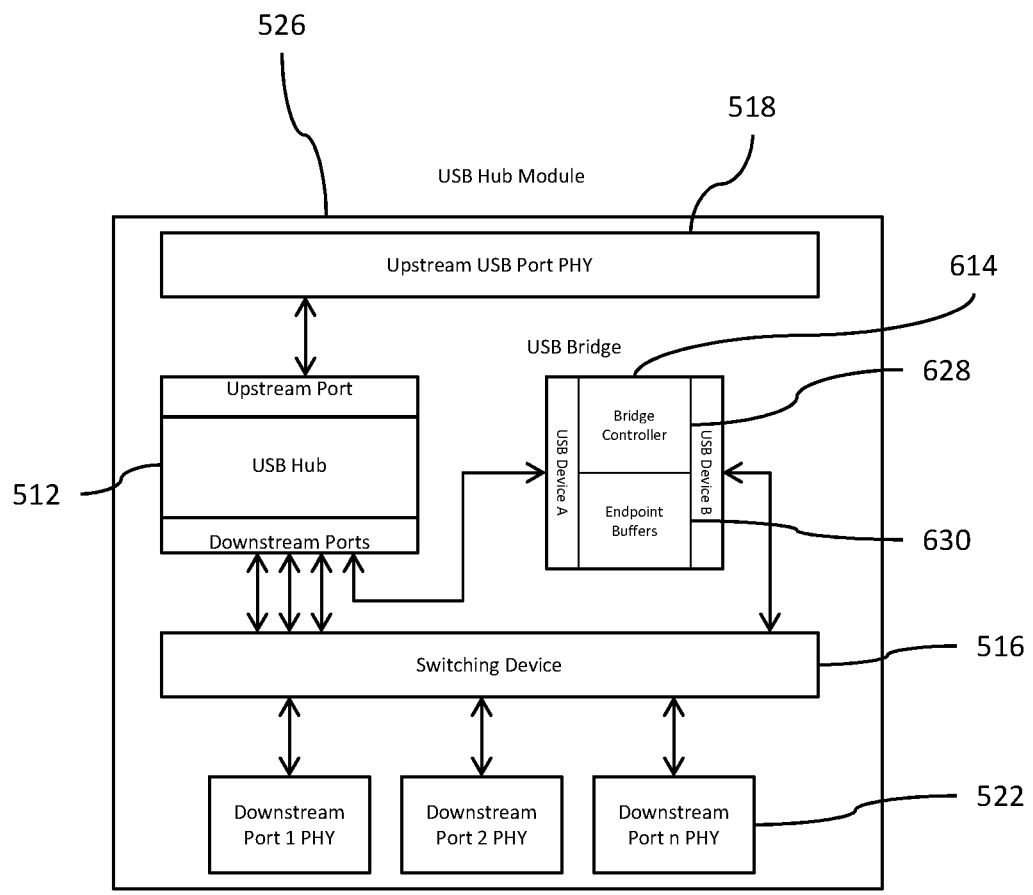
FIG. 6 illustrates the different components of the combination USB hub/bridge IC shown in FIG. 5.

FIG. 6 illustrates the internal components of the USB hub/bridge IC 526 shown in FIG. 5. As shown, preferably the components of the USB bridge 614 include a bridge controller 628 as well as endpoint buffers 630. While the exact configuration of endpoints is effectively up to the system designer to choose for a particular need, a specific example of one possible endpoint configuration is shown in FIG. 7; however, many others are possible.

Figure 7:
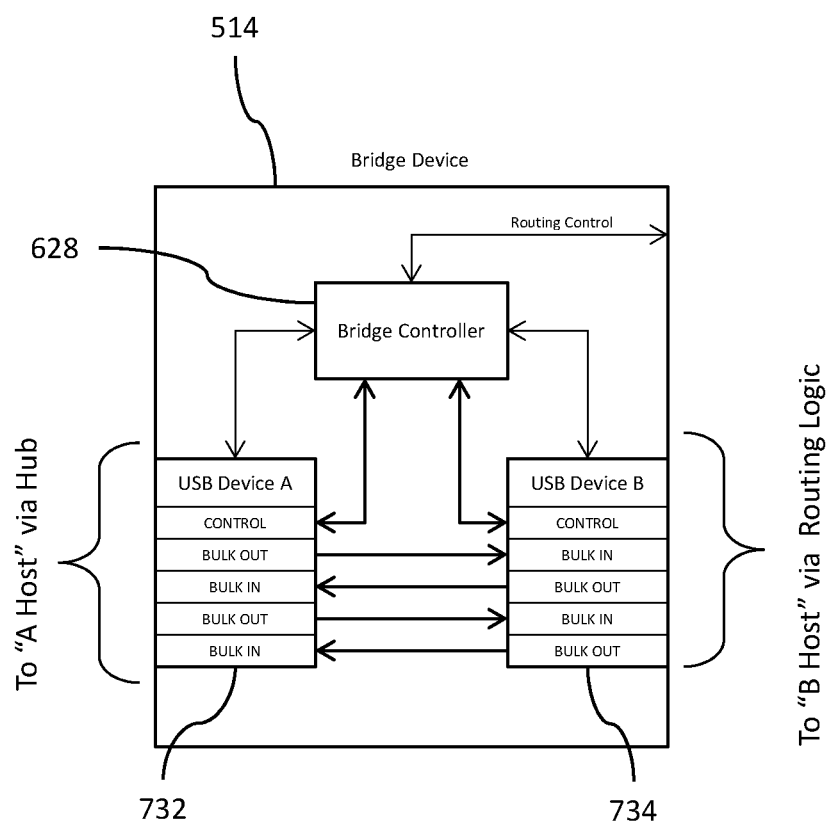
FIG. 7 illustrates one possible endpoint configuration of the USB bridge shown in FIGS. 5 and 6.

As shown in FIG. 7, the endpoints of the USB bridge 614 may be designed to support multiple pipes of Bulk USB data connections between the host A (head unit) and host B (consumer device). In the USB bridge 614, the IN endpoints of device A are connected to the OUT endpoints of device B and the OUT endpoints of device A 732 are connected to the IN endpoints of device B 734. The design of the USB bridge 614 may be such that the data flow between the endpoints may be direct or buffered. For example, in the case of direct connection, once a USB packet is received from host A on a device A OUT endpoint, the internal logic of the USB bridge 614 moves to packet to the device B IN endpoint if it is available. If device B IN endpoint is full or otherwise not available then subsequent attempts of Host A to send more packets to device A in the USB bridge 614 will be rejected until such time that the device B IN endpoint is clear and the contents of the device A OUT buffer is moved to it. Alternatively, there may exist a local buffer in the USB bridge 614 between the endpoints of device A and B. For example, packets received on an OUT endpoint of device A are placed in a local memory device for temporary storage until device B IN endpoint is ready for them. The OUT endpoints are thus capable of receiving multiple packets from the Host until the buffer is full. Likewise the IN endpoints may, at times, transmit multiple packets until the buffer is empty. Such buffers are not required, but are envisioned, to improve system throughput performance in certain circumstances where one of the USB hosts is occasionally busy and not keeping up with USB transactions at the same rate as the other USB host. Regardless of the buffer configuration, the USB bridge hardware has IN and OUT endpoints on device A mapped to OUT and IN endpoints respectively on device B, thus forming a bidirectional bridge that passes USB traffic between two USB hosts with bandwidth sufficient to support the application requirements of the system.

Also shown in FIG. 7, device A 732 and device B 734 provide a bidirectional control endpoint connected to their respective USB hosts. Control endpoints are required per the USB standard to support USB defined control messages between the host and device both during and after the enumeration sequence. Optionally, USB endpoints may also be utilized per USB standard to employ messages intended to control user defined custom device specific behavior, referred to as vendor specific messages. As can be seen in FIG. 7, the control endpoints are mapped to the bridge controller 628. The BC logic may be implemented in hardware or preferably software. The bridge controller 628 provides the capability to send, receive and process USB standard control endpoint messages as well as vendor specific messages essential to the control and operation of the USB bridge 614. At system startup, host A requests and receives descriptors from the bridge controller 628 via the control endpoint. Once complete, host A then loads the bridge driver in its software stack and configures the custom Bridge hardware for operation. Host A can then control the functions of the USB bridge 614, such as USB switch routing control. The system is now ready to accept connection with USB host mode consumer devices on device B 734 of the USB bridge 614. When such a connection is made, the bridge controller 628 will notify the bridge driver in host A by sending a message on the control endpoint to host A. Further, host B will begin sending descriptor requests on the control endpoint to device B 734 in the USB bridge 614. The bridge controller 628 receives theses requests, encapsulates them with information that identifies them as descriptor requests from host B and passes them to the bridge driver on host A using the control endpoint. The host A bridge driver receives these requests, identifies them as descriptor requests and passes the requests on to other software components in host A system and waits for the descriptor responses. The descriptor responses are encapsulated by the bridge driver to indicate they are descriptor responses that are to be forwarded to host B. The response is then sent to the bridge controller 628 via the control endpoint. The bridge controller 628 receives them, identifies them as descriptor responses that should be forwarded to device B and places them on the control endpoint for device B 734. This process of receiving and forwarding messages back and forth between the two hosts continues until the enumeration process is complete with host B. From that point on the two hosts may begin to use the IN and OUT endpoints to transfer application data and services over the bulk endpoints.

Figure 8:
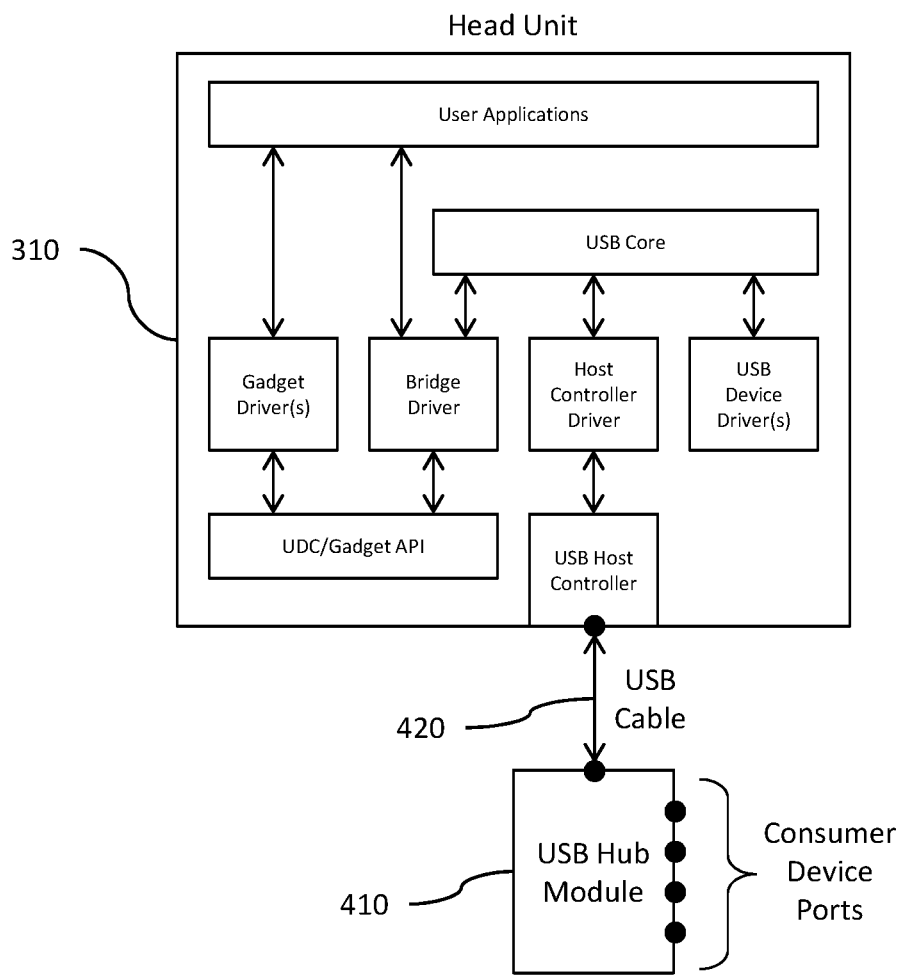
FIG. 8 illustrates an example implementation of a head unit software architecture.

FIG. 8 illustrates one possible configuration of the system architecture including software components in the head unit 310 interfacing with the USB hub module 410. There are multiple ways that the operating system and software architecture can be constructed to support the functions of the USB hub module 410. In FIG. 8, a typical Linux implementation is shown including the USB hub module 410 and the head unit 310. The system design utilizes standard Linux kernel components and configurations and should be familiar to those skilled in the art. The head unit's USB host controller hardware is driven by the host controller driver. the host controller driver is connected to the USB core. The USB core connects the host controller driver with the standard USB Linux device drivers and the custom bridge driver. The bridge driver is configured to optionally connect directly to the user space application software or to the USB gadget driver depending on system architecture. The custom bridge driver plays a dual role of both controlling the functions of the bridge hardware as well as providing a data path between the gadget device drivers and applications running on the head unit 310. The architecture illustrated is capable of handling both the operation and data paths associated with the USB bridge 414 and the USB hub 412 at the same time, thus allowing concurrent operation of consumer devices operating in USB device mode with consumer devices operating in USB host mode. In one embodiment, the USB hub module 410 supports simultaneous active USB data connections between the head unit 310 and multiple consumer devices, at least one of which being in host mode while the others are in device mode. In another embodiment, the USB hub module 410 supports simultaneous active USB data connections between the head unit 310 and some combination of embedded and consumer USB devices along with at least one device being in host mode. While it is understood that the software functions of the head unit 310 are essential to building a complete system, the designs of which can vary significantly and this example is provided only as a means of demonstrating one way to utilize the functionality of the present invention.

Figure 9:
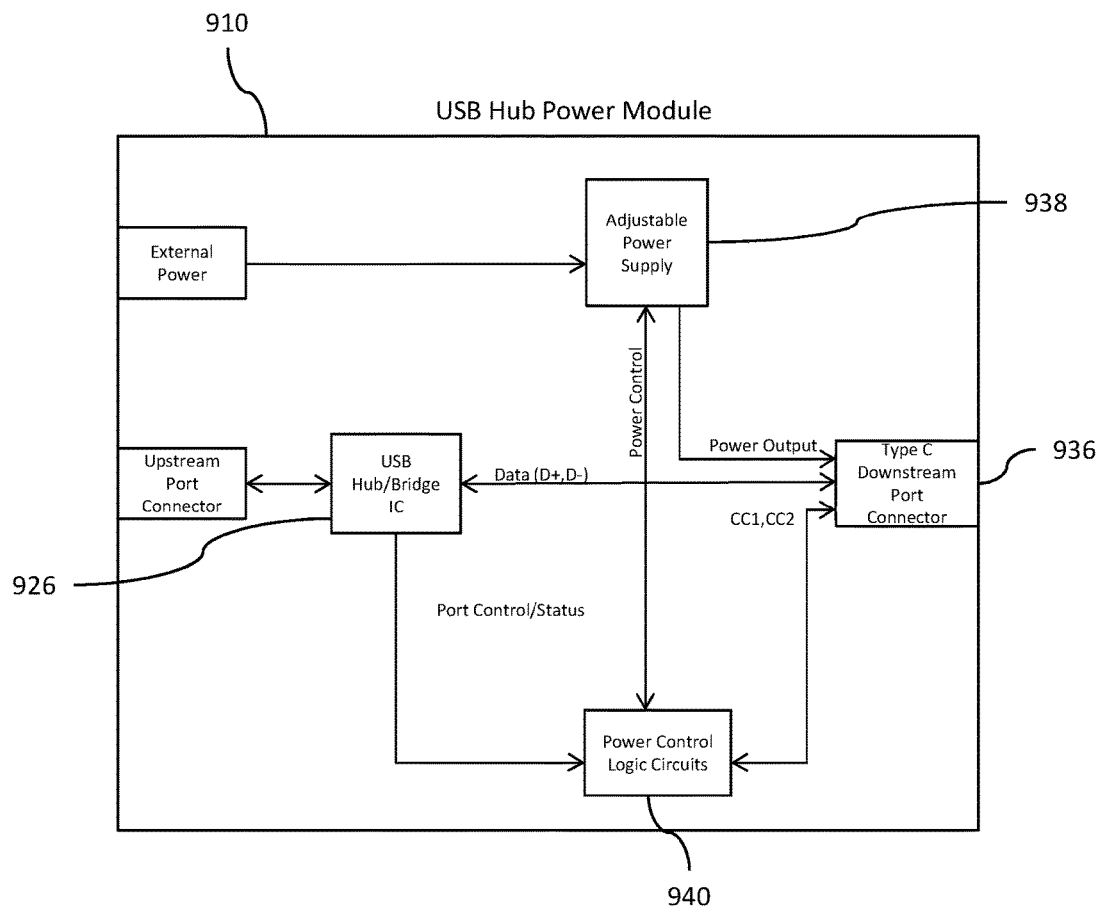
FIG. 9 illustrates an example of a USB hub power module.

FIG. 9 illustrates a USB hub power module 910 that includes USB power delivery capability as described USB Power Delivery Specification Rev. 3.0 v1.0 published Mar. 25, 2106 by the USB Implementer's Forum, Inc. This technology provides the means for the USB hub power module 910 to provide greater charging capabilities to the consumer devices connected to the downstream ports. The USB hub power module 910 has at least one downstream port connector 936 that conforms to the USB Type C standard as described in the USB Type-C Cable and Connector Specification, Revision 1.2 published Mar. 25, 2106 by the USB Implementer's Forum, Inc. In addition to the functions of the USB hub module 410, 510, or 610 discussed above, this USB hub power module 910 further includes adjustable voltage power supplies 938, power control logic circuits 940 to facilitate handshaking over the CC1 and CC2 pins, and a communication control stack that is integral to the logic circuits. The USB Type-C connector requirements include data transmissions between the electrical power provider (source) and the electrical power consumer (sink) on CC1 and CC2 pins defined in the USB Type C standard as a handshaking function. The source in this case is the USB hub power module 910 and the sink is the consumer device (not shown) connected to the downstream port connector 936. To facilitate the handshake function on the CC1 and CC2 pins, additional logic circuits in the form of separate discrete IC's and passive components may be added to the USB hub power module 910 as shown in FIG. 9. To facilitate the handshake function on the CC1 and CC2 pins and control the adjustable power supplies 938, additional logic circuits may be added to the USB hub power module 910 in the form of separate discrete IC's and passive components. Preferably, the logic circuits, communication stack, and physical layer interface functions would be integrated in the USB hub/bridge IC 926, thereby reducing bill of material costs and manufacturing costs.

Figure 10:
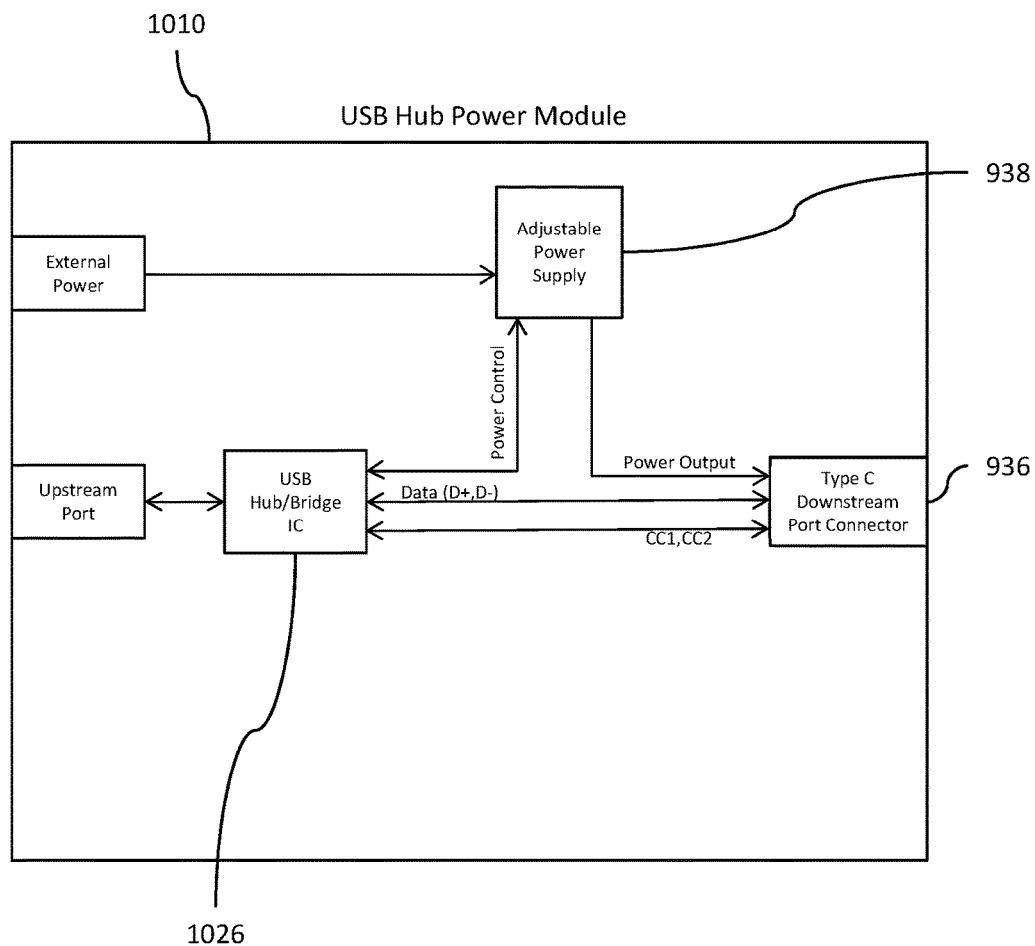
FIG. 10 illustrates another example of a USB hub power module.

As alternate embodiment of the USB hub power module 1010 is shown in FIG. 10. The power control logic circuits are further integrated in a USB hub/bridge IC 1026, thereby further reducing bill of material costs and manufacturing costs.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A Universal Serial Bus (USB) hub module, comprising:
an upstream USB port;
a plurality of downstream USB ports;
a USB hub interconnected to the upstream USB port and the plurality of downstream USB ports, said USB hub configured to broadcast data from the upstream USB port to each downstream USB port and to transmit data from each downstream USB port to the upstream USB port;
a USB bridge interconnected to the USB hub and configured to connect the upstream USB port to a USB host; and
a USB routing switch interconnected to the USB bridge, the USB hub, and the plurality of downstream USB ports, wherein the USB routing switch is configured to connect a first downstream USB port of the plurality of downstream USB ports to the upstream USB port through the USB bridge when a consumer device connected to the first downstream USB port is the USB host and is configured to initiate bidirectional communication with the upstream USB port, and wherein the USB routing switch is configured to connect the first downstream USB port directly to the USB hub when the consumer device connected to the first downstream USB port is configured to only respond to communication from the upstream USB port, thereby rendering the consumer device compatible with a device connected to the upstream USB port.

2. The USB hub module according to claim 1, wherein the USB routing switch is configured to connect the first downstream USB port to the USB hub through the USB bridge when a first consumer device connected to the first downstream USB port is acting as the USB host, and wherein the USB routing switch is configured to simultaneously connect a second downstream USB port of the plurality of downstream USB ports directly to the USB hub when a second consumer device connected to the second downstream USB port is acting as a USB device, thereby rendering the first and second consumer devices compatible to communicate simultaneously with the upstream USB port.

3. The USB hub module according to claim 1, wherein the USB hub module is configured to recognize whether the consumer device connected to the first downstream USB port is configured to act as the USB host or as a USB device and control the USB routing switch accordingly.

4. The USB hub module according to claim 1, wherein the USB hub module is configured to dynamically switch operation of the plurality of downstream USB between a USB device mode and a USB host mode.

5. The USB hub module according to claim 1, wherein the USB routing switch is configured to connect the consumer device to either the USB bridge or the USB hub based on whether the consumer device attached to each downstream USB port in the plurality of downstream USB ports is configured to act as the USB host or a USB device.

6. The USB hub module according to claim 1, wherein the USB routing switch comprises a plurality of USB analog multiplexing switches.

7. The USB hub module according to claim 1, wherein the USB bridge is configured to control the USB routing switch.

8. The USB hub module according to claim 1, wherein the USB bridge comprises a bridge controller as well as endpoint buffers.

9. The USB hub module according to claim 8, wherein the endpoint buffers are configured to support a USB data connection pipe between an infotainment system and the consumer device.

10. The USB hub module according to claim 1, wherein the USB routing switch comprises digital routing logic.

11. The USB hub module according to claim 1, wherein the USB hub module further comprises a logic circuit configured to provide data handshaking to negotiate electrical power transfer from the USB hub module to a first consumer device connected to the first downstream USB port, and wherein the USB hub module further comprises a power supply circuit configured to provide electrical power from the USB hub module to the first consumer device.

12. The USB hub module according to claim 11, wherein the logic circuit includes a communication control stack.

13. The USB hub module according to claim 11, wherein the power supply circuit includes adjustable voltage power supplies.

14. An integrated circuit, comprising:
a USB hub configured to be interconnected to an upstream USB port and a plurality of downstream USB ports, said USB hub configured to broadcast data from the upstream USB port to each downstream USB port and to transmit data from each downstream USB port to the upstream USB port;
a USB bridge interconnected to the USB hub and configured to connect the upstream USB port to a USB host; and
a USB routing switch interconnected to the USB bridge, the USB hub, and the plurality of downstream USB ports, wherein the USB routing switch is configured to connect a first downstream USB port of the plurality of downstream USB ports to the upstream USB port through the USB bridge when a consumer device connected to the first downstream USB port is the USB host and is configured to initiate bidirectional communication with the upstream USB port, and wherein the USB routing switch is configured to connect the first downstream USB port directly to the USB hub when the consumer device connected to the first downstream USB port is configured to only respond to communication from the upstream USB port, thereby rendering the consumer device compatible with a device connected to the upstream USB port.

15. The integrated circuit according to claim 14, wherein the USB routing switch is configured to connect the first downstream USB port to the USB hub through the USB bridge when a first consumer device connected to the first downstream USB port is acting as the USB host, and wherein the USB routing switch is configured to simultaneously connect a second downstream USB port of the plurality of downstream USB ports directly to the USB hub when a second consumer device connected to the second downstream USB port is acting as a USB device, thereby rendering the first and second consumer devices compatible to communicate simultaneously with the upstream USB port.

16. The integrated circuit according to claim 14, wherein the USB routing switch is configured to connect the consumer device to either the USB bridge or the USB hub based on whether the consumer device attached to each downstream USB port in the plurality of downstream USB ports is configured to act as the USB host or a USB device.

17. The integrated circuit according to claim 14, wherein the USB bridge is configured to control the USB routing switch.

18. The integrated circuit according to claim 14, wherein the integrated circuit further comprises a logic circuit configured to provide data handshaking to negotiate electrical power transfer from the USB hub module to a first consumer device connected to the first downstream USB port.

19. The integrated circuit according to claim 18, wherein the logic circuit includes a communication control stack.

* * * * *